United States Patent
Nayak et al.

(10) Patent No.: US 7,050,261 B2
(45) Date of Patent: May 23, 2006

(54) MAGNETIC RECORDING TAPE DRIVE WITH TAPE GUIDE ASSEMBLY HAVING DAMPENING DISK

(75) Inventors: Ashok B. Nayak, Glendora, CA (US); Ming-chih Weng, Los Angeles, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 205 days.

(21) Appl. No.: 10/607,483

(22) Filed: Jun. 27, 2003

(65) Prior Publication Data

US 2004/0001284 A1    Jan. 1, 2004

Related U.S. Application Data

(60) Provisional application No. 60/392,985, filed on Jun. 28, 2002.

(51) Int. Cl.
*G11B 15/67* (2006.01)
*G11B 15/60* (2006.01)
*B65H 23/04* (2006.01)

(52) U.S. Cl. ............ 360/95; 360/130.21; 226/196.1

(58) Field of Classification Search .......... 360/130.21, 360/95; 226/196.1; 242/346, 615
See application file for complete search history.

(56) References Cited

U.S. PATENT DOCUMENTS

| | | | | |
|---|---|---|---|---|
| 4,646,177 A | * | 2/1987 | Sanford et al. | ............... 360/95 |
| 4,842,177 A | | 6/1989 | Callender et al. | |
| 5,218,501 A | * | 6/1993 | Sellke | ............... 360/130.21 |
| 5,224,641 A | | 7/1993 | Spicer | |
| 5,414,585 A | | 5/1995 | Saliba | |
| 5,447,279 A | * | 9/1995 | Janssen et al. | ............... 226/196.1 |
| 6,353,514 B1 | * | 3/2002 | Rambosek et al. | .... 360/130.21 |

\* cited by examiner

*Primary Examiner*—Craig A. Renner
(74) *Attorney, Agent, or Firm*—Thelen Reid & Priest LLP

(57) ABSTRACT

A tape drive is provided having a pair of stationary guide assemblies disposed symmetrically about the magnetic read/write head. Each of the stationary guide assemblies has a mounting portion and a separate guide surface portion mounted on the mounting portion. The mounting portion may be made of a plastic and the guide surface portion of a ceramic, for example. A spring arrangement with pressure pads is mounted directly on the mounting portion, and applies pressure to a top edge of a tape during guiding of the tape.

10 Claims, 7 Drawing Sheets

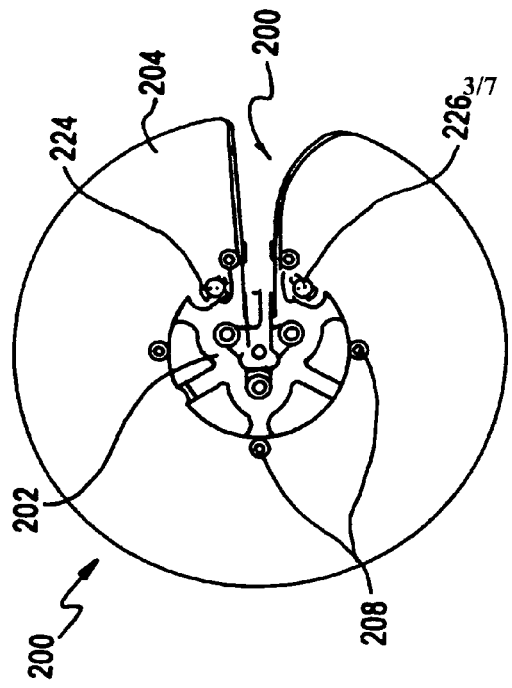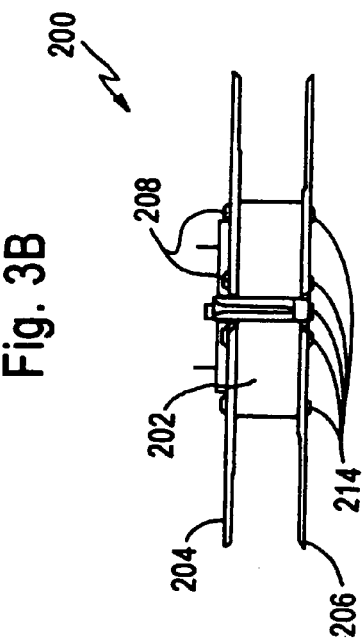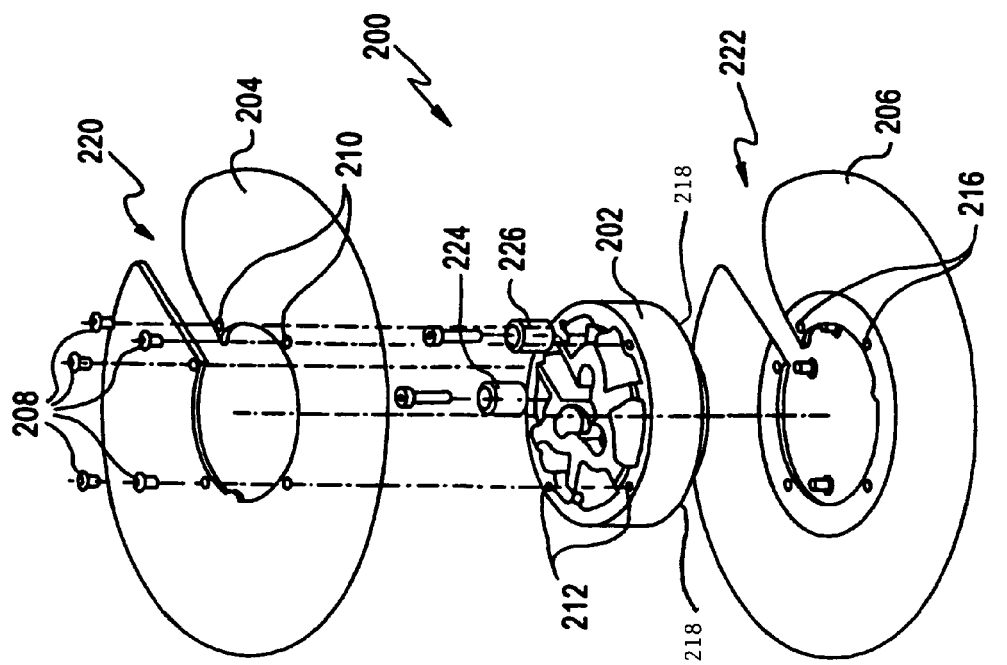

MAGNETIC RECORDING TAPE DRIVE WITH TAPE GUIDE ASSEMBLY HAVING DAMPENING DISK

RELATED APPLICATIONS

This application claims the benefit of U.S. Provisional Application Ser. No. 60/392,985, filed Jun. 28, 2002, the contents of which are hereby incorporated by reference.

FIELD OF THE INVENTION

The present invention relates to a magnetic tape drive device used in conjunction with single reel tape cartridges and, more particularly, to a stationary guide assembly for such a tape drive device.

BACKGROUND OF THE INVENTION

Tape drive devices for storing magnetic data are well known in the art. In the forward mode, tape is moved from a supply reel, which supplies the tape, to a take-up reel, which draws tape from the supply reel along the tape path and over the magnetic read/write head. In the reverse mode, tape is moved from the take-up reel to the supply reel.

Tape cartridge configurations for data storage generally fall into one of two categories. In the first category, both reels are located inside a single magazine or cartridge, that is, the supply reel and the take-up reel are contained within a single housing. In the forward read/write mode, the tape moves from the supply reel to the take-up reel in a single housing and vice versa in the reverse mode. The read/write head is located in the tape drive separate from the tape cartridge. Examples of such cartridges include quarter-inch cartridges ("QIC"), digital audio tape ("DAT") cartridges, and audio/video cassettes.

The second category of tape cartridge configurations has only a single reel, generally the supply reel, in the cartridge or magazine. This type of cartridge is used with a tape drive having a take-up reel permanently housed in the tape drive unit. In such tape drives, the tape cartridge is inserted into the tape drive unit. The cartridge is then registered and the front end, or leader end, of the tape is transferred from the supply reel along the tape path of the tape drive to the take-up reel. The magnetic read/write head, which reads or writes to the tape, is located along the tape path and the take-up reel serves to draw the tape across the magnetic read/write head. Examples of such cartridges include DLT (Digital Linear Tape) cartridges made by Quantum, 3480/3490 cartridges made by IBM, and LTO (Linear Tape Open) cartridges to be made by Seagate Technologies, Inc., Hewlett Packard, and IBM.

There are a number of single reel tape cartridges available in the marketplace. Tape drives that work in conjunction with such cartridges have a take-up reel located inside the tape drive housing and should have a suitable tape path for proper tape handling. The tape paths of these tape drives provide many, if not all, of the following features:

- a proper wrap angle to the read/write head;
- the ability to filter out axial runout of the reels/motors as the tape moves from a reel to the head (i.e., the tape path must move the tape in a reasonably straight path);
- minimization of, and the effects of, misalignment between the reels;
- minimization of drops in the tape tension along tape guiding elements as the tape travels from one of the reels to the read/write head;
- minimization of tape wear at the media surface and at its edges;
- operation in a rapid start/stop mode;
- minimization of shifting in the tape position when the tape changes from a forward direction to a reverse direction, or vice versa;
- a suitable surface under varying humidity and temperature conditions to ensure that the tape does not stick to the guiding elements; and
- a suitable surface to conduct electrostatic charges that build up on the tape surfaces.

To achieve the above features, tape paths generally have a combination of tape guiding elements or members. Examples of these guiding elements include flanged or flange-less guide rollers, fixed guides, and air bearing guides.

One known tape path is disclosed in U.S. Pat. No. 5,414,585, which uses a large number of tape guide rollers to guide the tape along the tape path from the supply reel to the take-up reel. One of the problems associated with this design is the large initial motor current that is required to overcome the mass moment of inertia of the rotating guide elements. As a result, for a rapid start/stop requirement, this device has potential problems.

Moreover, depending on tolerances allowed during fabrication of this type of tape drive, each of the guide rollers may contribute to error in the tape path, rather than eliminate the error. Also, these tape guide rollers use precision ball bearings, which must be lubricated to reduce wear and, subsequently, raise the possibility of failure. The motors in these tape drives also must produce a certain amount of torque to overcome the drag produced by the rollers, thus requiring higher torque motors.

Another known tape drive with its associated tape path is described in U.S. Pat. No. 5,224,641 (also U.S. Pat. No. 4,842,177), in which the drive utilizes air bearing guides as its guide elements. Air bearing guides are advantageous in that they are highly reliable, provide excellent tape guiding, and result in very low stiction. There are problems, however, with air bearing guides because, foremost, they utilize an air pump and must have the necessary plumbing to get the air from the air pump to the air bearing. Modern computers, however, are very constrained with respect to space and tape drives must satisfy a certain form factor. As a result, if the form factor of the tape drive is small, then air bearing guides are not a good solution because of the space required to house the air pump and the associated plumbing elements. In addition, tape drives that utilize air bearing guides are very expensive.

Tape drives having tape paths that utilize only fixed guides are well known in the art, but have many problems. In such tape drives, a well-designed tape path has a maximum length of tape between the supply reel and the take-up reel. Fixed guides produce friction in the tape path, a problem that is considerably more serious in humid environments. Stiction is exacerbated if the angle that the tape must wrap around the fixed guide (i.e., the "wrap angle") is large and/or if the contact area is large.

One type of fixed guide, or "stationary guide", has been sold by Seagate Removable Storage Solutions LLC in its tape drives and includes a number of components to form the basic fixed or stationary guide assembly. These components include the guide, the spacer, upper inserts, lower inserts, and finger-locating dowel pins. Although the fixed guide assembly operates effectively, certain improvements may be made to the assembly design. For example, some of the concerns with respect to the fixed guide assembly in the tape drives include the relatively large number of components, the number of fasteners utilized for their attachments, the relatively high overall tolerances that are required, and the relatively high cost of the guide due to the large number of components. Furthermore, the relatively high cost is also a result of the basic guide construction, which employs a ceramic material throughout its entire geometry.

Another concern regarding the fixed guide assembly is the design of the compliant pad-finger spring construction and its mounting. The pad-finger supporting beams have a relatively limited length, producing a higher spring-rate. Furthermore, the unconnected pad-finger supporting beams do not allow for a synchronous mode of the beams. This prevents simultaneous biasing of the tape by the pad-fingers. Also, there is no dampening mechanism for the pad springs, resulting in high excursions of tape motion at a resonance frequency.

SUMMARY OF THE INVENTION

There is a need for an improved magnetic tape drive having a stationary guide assembly that overcomes the problems with prior fixed guides, including for example, providing a lower spring rate, providing a synchronous mode of the spring beams, providing for a dampening mechanism for the pad-finger spring, and reducing the overall cost of the guide.

These and other needs are met by embodiments of the present invention which provide a magnetic recording tape drive comprising a magnetic read/write head and a stationary guide for guiding tape past the magnetic read/write head. The stationary guide has a mounting portion and a separate guide surface portion mounted on the mounting portion. A spring arrangement is mounted directly on the mounting portion to apply pressure to a top edge of the tape during guiding of the tape.

The composite nature of the stationary guide of the magnetic recording tape drive of the present invention allows for reduction in the overall tolerances, and reduction in the costs due to the number of components. For example, the mounting portion may be made of a plastic material and combine the functions of certain components into a single assembly. In comparison to prior fixed guides, this results in the elimination of a spacer, inserts, finger-locating pins and associated fasteners that can cause reduced reliability. Further, reduced costs are also possible since the ceramic material may be employed only in the guide surface portion mounted on the mounting portion, rather than throughout the entire guide construction.

In certain embodiments of the invention, the spring arrangement has increased length pad-finger supporting beams. This substantially reduces the spring rate of the compliant pad-finger springs. Further, the tolerance concerns are reduced by providing a higher deflection of the pad-finger for an equal load. Further, in certain embodiments, two damping devices are employed, which reduces undamped vibration concerns.

In certain embodiments of the invention, a stationary tape guide for a tape drive is provided comprising a mounting portion made of a first material, and a guide surface portion made of second material different from the first material and mounted to the mounting portion. The guide surface portion includes a tape guide surface. A spring arrangement is mounted directly on the mounting portion to apply pressure to a top edge of a tape during guiding of the tape.

In still further aspects of the invention, a magnetic recording tape drive is provided with a read/write head and means for guiding tape past the read/write head.

The foregoing and other features, aspects and advantages of the present invention will become more apparent from the following detailed description of the present invention when taken in conjunction with the accompanying drawings.

BRIEF DESCRIPTION OF THE DRAWINGS

The following detailed description of the embodiments of the invention is best understood when read in conjunction with the accompanying drawings, in which:

FIGS. 3A–3C are several views of the take-up reel assembly of FIG. 1;

DETAILED DESCRIPTION OF THE INVENTION

The present invention addresses and solves problems related to the use of a fixed tape guide in a magnetic tape drive, by reducing the number of components in a tape guide as well as reducing the costs of the manufacture of the tape guide. This is achieved, in part, by the use of a composite stationary guide that has a mounting portion made of plastic, for example, and a tape guide surface portion that is mounted to the mounting portion. Since the plastic portion may be molded, many elements for mounting the spring arrangement to the guide body may be eliminated, reducing tolerances and costs. Further, by not requiring the entire guide body to be made of ceramic, costs are further reduced. Additionally, the spring arrangement provides a longer beam length and a lower spring-rate. By connecting the beams, as in certain embodiments, a synchronous mode of the beams is provided that allows simultaneous biasing of the tape by the pad fingers. Also, in certain embodiments, a damping mechanism for the pad-finger spring is provided. This prevents high excursions of motion at a resonance frequency.

Figure 1:
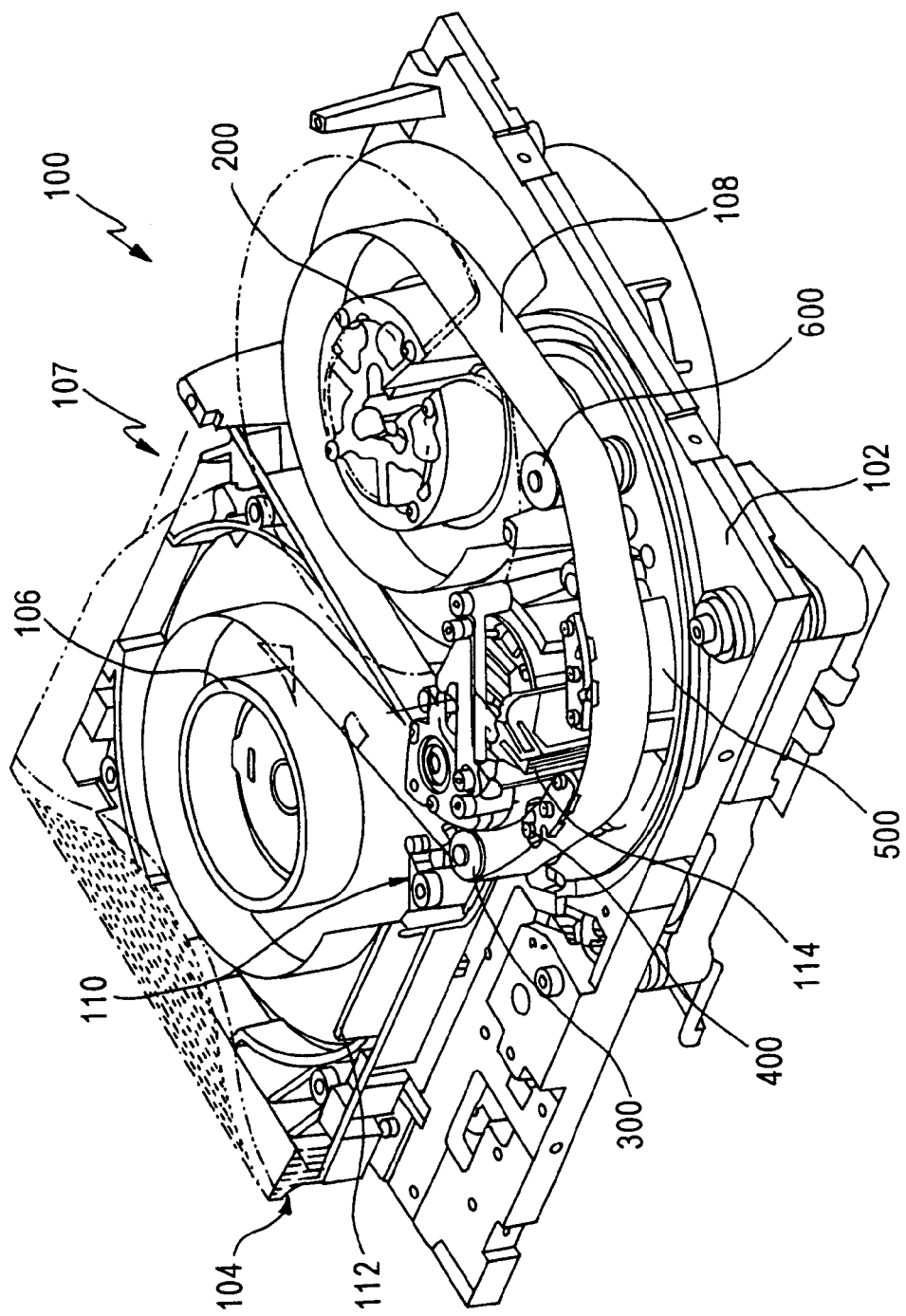
FIG. 1 is a perspective view of a tape path for a single reel cartridge tape drive according to the invention.
Figure 2:
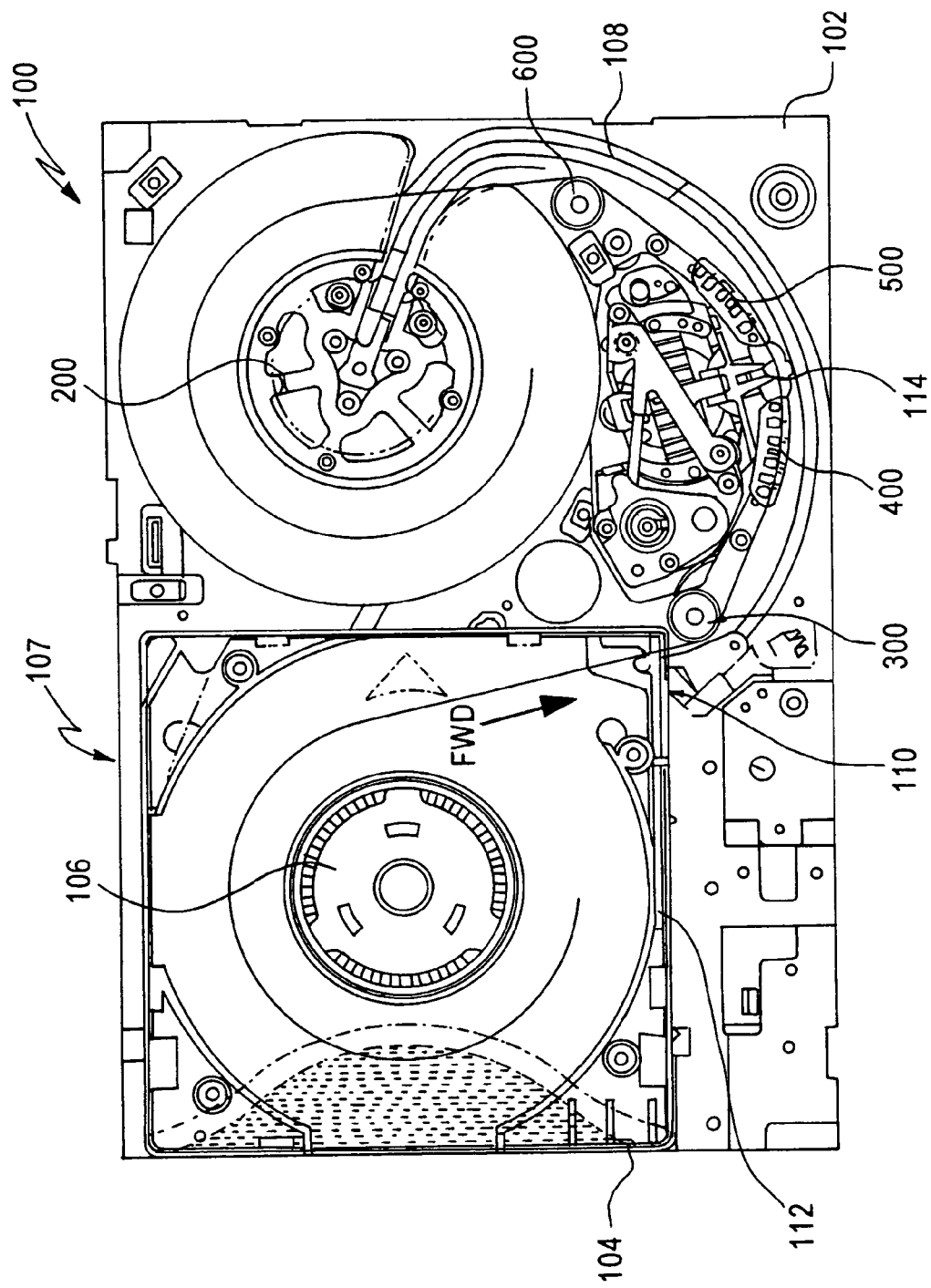
FIG. 2 is a top view of the tape path of FIG. 1.

Referring now to the drawings, and initially to FIGS. 1 and 2, there will be seen a tape drive unit 100. The tape drive unit comprises a main base plate 102 and a housing (not shown). A cartridge 104 containing the supply reel or cartridge reel 106 is inserted into a cartridge receiving area 107 of the tape drive 100. A tape 108 is wound on the supply reel 106. The cartridge 104 is equipped with a slot 110 that is covered by a door 112 when the cartridge 104 is not inserted into the drive 100. The slot 110 allows the tape 108 to pass outside of the cartridge 104 when the drive 100 is in use. The door 112 protects the tape 108 when the cartridge 104 is not inserted in the tape drive 100. The door 112 is opened by a mechanism (not shown) once it is inserted into the tape drive.

The tape drive 100 also has a take-up reel 200. The take-up reel 200 draws the tape 108 from the supply reel 106 along the tape path and winds the tape 108 in the forward read/write mode. The tape drive 100 also has a magnetic read/write head 114 that reads from and writes to the tape 108. The tape 108 must be drawn across the magnetic read/write head 114 at a vertical location that does not change substantially across the entire length of the tape 108.

Disposed on either side of the magnetic read/write head 114 are a guide roller assembly 300, 600 and a fixed or stationary guide assembly 400, 500. The forward guide roller assembly 300 and the forward fixed guide assembly 400 are placed between the tape cartridge 104 and the magnetic read/write head assembly 114. The rearward fixed guide assembly 500 and the rearward guide roller assembly 600 are disposed between the magnetic read/write head assembly 114 and the take-up reel 200. In other words, as the tape 108 is drawn from the supply reel 106 to the take-up reel 200, the tape 108 first passes the forward guide roller 300, then the forward fixed guide 400, the magnetic read/write head 114, the rearward fixed guide 500, and finally passes the rearward guide roller prior to being wound by the take-up reel assembly 200.

The forward guide roller 300 is positioned in the vicinity of the slot of the cartridge. The forward guide roller 300 is positioned to ensure that the tape 108 exits properly from the cartridge, for instance, so that the tape 108 will not contact the cartridge as the cartridge reel goes from a filly loaded condition to an empty condition. Moreover, the location of the forward guide roller 300 provides suitable angles and ranges (preferably, 66 degrees at the beginning of the tape and 45 degrees at the end of the tape) around the guide roller 300 and provides a maximum distance between the supply reel 106 and the forward guide roller 300 and a maximum distance between the forward guide roller 300 and the forward fixed guide 400.

The forward fixed guide 400 is positioned to provide the necessary wrap of the tape 108 at the magnetic read/write head 114. Based on the geometry of the read/write head 114, a certain wrap angle of the tape is necessary for a proper head tape interface. The correct wrap angle also limits tape surface wear and maintains the head air bearing effects.

The tape path is symmetrical about the read/write head assembly 114 to ensure that the tape 108 is subject to the same forces and the like, regardless of whether the tape drive 100 is operating in the forward mode or the reverse mode. In other words, the distance and tape path between the forward fixed guide 400 and the magnetic read/write head 114 are substantially identical to the distance and tape path between the rearward fixed guide 500 and the magnetic read/write head 114. The distance and tape path between the forward guide roller 300 and the forward fixed guide 400 are substantially identical to the distance and tape path between the rearward guide roller 600 and the rearward fixed guide 500.

As shown in FIGS. 3A–3C, the take-up reel comprises a take-up hub 202 with flanges 204, 206 disposed on either side of the hub 202. The top flange 204 is mounted to the take-up hub 202 via a plurality of screws 208. The screws 208 are inserted through a plurality of screw-holes 210 in the flange 204. The screw-holes 210 are distributed substantially evenly about the inner periphery of the top flange 204. The screws 208 are then inserted into the corresponding holes 212 in take-up hub 202 and tightened.

The bottom flange 206 is mounted to the take-up hub in substantially the same manner. That is, a plurality of screws 214 are inserted through a plurality of screw-holes 216 in the flange 206. The screw-holes 216 are distributed substantially evenly about the inner periphery of the bottom flange 206. The screws 214 are then inserted into the corresponding holes 218 (opposite corresponding holes 212) in take-up hub 202 and then tightened firmly to hold the bottom flange 206 in place.

In the embodiment of FIGS. 3A–3C, there are five screws 208 fixing the top flange 204 to the take-up hub 202 and five screws fixing 214 fixing the bottom flange 206 to the take-up hub 202. The arrangement of the screws 208, 214 ensures that the clamping force is evenly distributed across the flanges 204, 206. Although five screws 208, 214 are shown, any number may be utilized so long as they are substantially evenly distributed about the inner periphery of each flange 204, 206. Also, other types of connecting fasteners may be used rather than screws.

Because the flanges have openings 220, 222, counterweights 224, 226 are inserted into the take-up hub 202. The counterweights 224, 226 ensure that the weight of the take-up reel assembly 200 is well-balanced and that the take-up reel assembly 200 is not adversely affected by centrifugal forces and not subject to unnecessary vibrations.

There are several advantages to the depicted embodiment of the take-up reel 200. Among these advantages is that each of the flanges 204, 206 has smooth and uninterrupted surfaces to minimize air turbulence as the flanges 204, 206 rotate during the forward or backward read/write modes of the tape drive 100. A substantially laminar air flow results under the flanges 204, 206, which greatly reduces unwanted movement of the tape 108 during rapid start/stop of the tape 108. Moreover, each flange 204, 206, as shown in FIG. 8C, is tapered to prevent the tape 108 from contacting the flanges 204, 206 during the read/write modes. As a result, the geometry of the take-up reel assembly 200 provides an excellent wind quality.

Figure 4A:
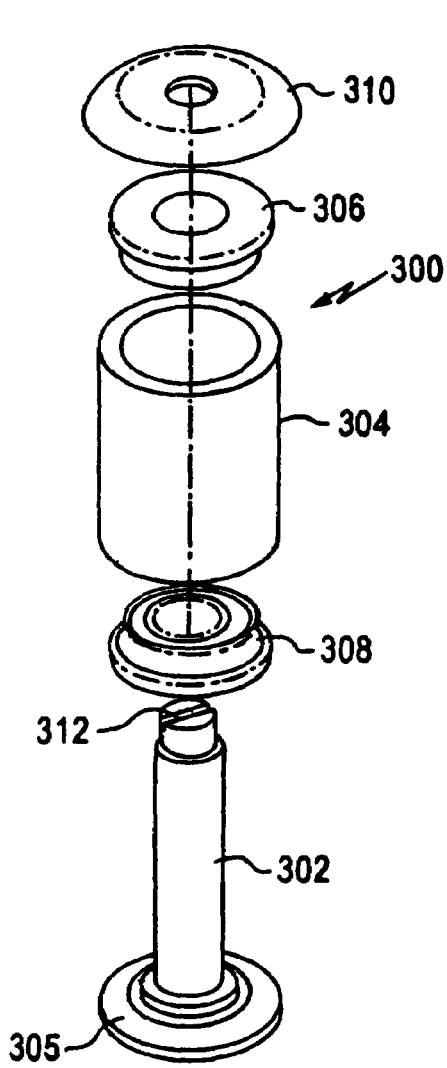
FIGS. 4A–4C are several views of the forward guide roller assembly of FIG. 1.
Figure 4B:
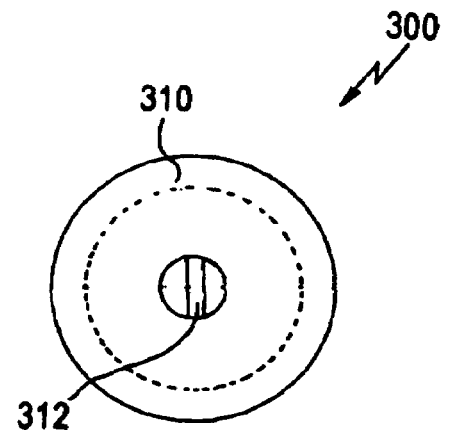
Figure 4C:
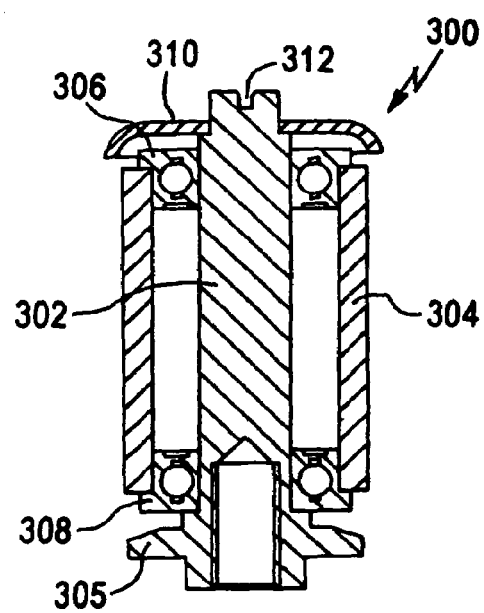

FIGS. 4A–4C show, in detail, the first guide roller 300. The forward guide roller 300 includes a shaft 302, which has an underside 305 that acts as a mounting surface for the forward guide roller 300. The shaft 302 is attached to the main base plate 102 of the tape drive 100 via a screw (not shown).

Disposed about the shaft 302 is a rotor or sleeve 304. The rotor 304 is supported by ball bearings 306, 308, which are located at either end of the shaft 302. A cover 310 is placed over a distal end of the shaft 302 to prevent contaminants from falling into the interior of the rotor 304 and the ball bearings 306, 308.

The distal end of the shaft 302 is also equipped with a slot 312 (or anti-rotation mechanism) that is used to prevent the shaft 302 from rotating during installation of the first guide roller 300 onto the main base plate 102 of the tape drive 100. For example, the head of a flat-head screw driver can be inserted into the slot 312 to prevent the shaft 302 from rotating while the screw (not shown) is inserted into the underside 305 at the proximal end of the shaft 302 through the main base plate 102.

Figure 6:
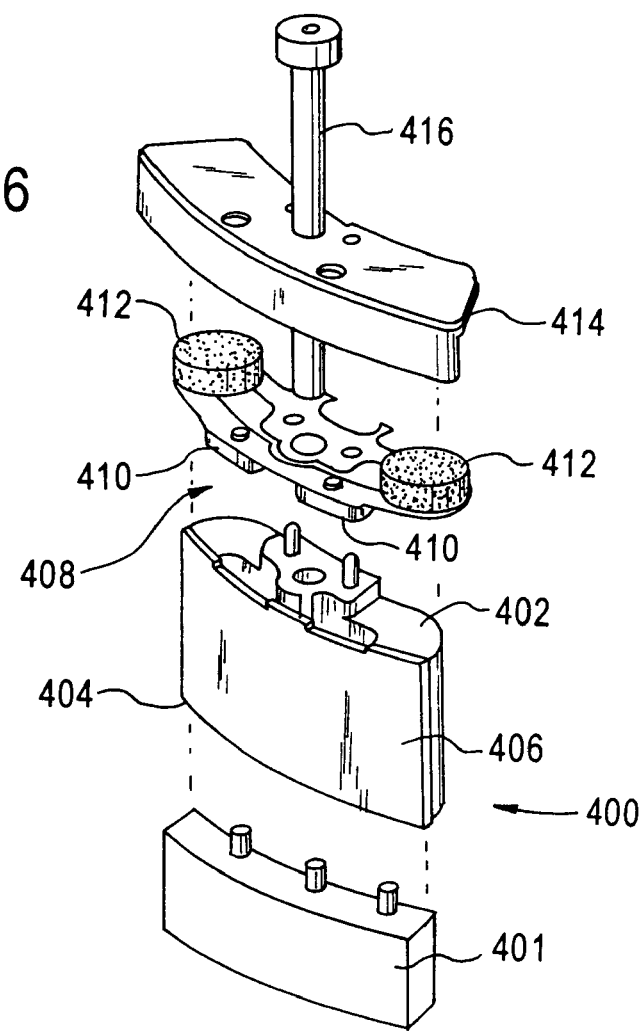
FIG. 6 shows an exploded, perspective view of a stationary guide constructed in accordance of the embodiments of the present invention.

During the forward read/write mode, the tape 108 is drawn from the supply reel 106 across the first guide roller 300. As the tape 108 is drawn closer to the take-up reel 200, the tape path next comprises the forward fixed or stationary guide 400, an exploded view of which is shown in detail in FIG. 6. The stationary guide 400 is located on the main base plate 102 using a plurality of locating pins (not shown). The stationary guide 400 is located precisely to provide the necessary wrap of tape 108 at the read/write head assembly 114. The location is also chosen to limit surface wear of tape 108 and to maintain the head air bearing effects.

The forward stationary guide 400 comprises a stationary guide mount 401 for mounting of forward stationary guide 400 to the main base plate 102 of the tape drive 100. The top of the stationary guide mount 401 provides a reference surface against which the tape 108 may be pressed. The stationary guide 400 may be mounted to the stationary guide mount 401 via screws (not shown), for example.

The stationary guide 400 is a composite tape guide such that the main body portion of the stationary guide 400 includes a mounting portion 402 and a guide surface portion 404 that are separate components but assembled together. Hence, the mounting portion 402 and guide surface portion 404 may be advantageously made of different materials to provide advantageous features.

In certain embodiments of the invention, the mounting portion 402 is made of a plastic material that is molded to include the specific design features that enhance the advantageous nature of the present invention. The guide surface portion 404 may be made of wear-resistant material, such as ceramic. A cost savings is realized since the entire body is not made of ceramic, but rather only a small portion of the body comprised by mounting portion 402 and guide surface portion 404 is made of ceramic. The connection of the guide surface portion 404 and the mounting portion 402 will be described in more detail later with respect to FIG. 9.

The guide surface portion 404 has a tape guide surface 406 that is curved, which provides a higher tape stiffness at the tape edges than the stiffness that results from a straight tape path. Also, although as described as being made of ceramic material, another wear-resistant material may be employed for the guide surface portion 404. The material should be selected such that it provides certain electrical resistivity to "bleed" static charges that are present in plastic films (resistivity values may be approximately 0.10 ohm-cms, for example).

The stationary guide 400 further includes a spring arrangement 408 on which are mounted pad fingers 410. A cover 414 is secured to the top of the stationary guide 400. A clamping screw 416 secures the cover 414 to the spring arrangement 408 and into the mounting portion 402. The cover 414 protects the pad fingers 410 and the tape path from contamination. The cover 414 also acts as a stop to limit the vertical translation of the pad fingers 410. The cover 414, in conjunction with the damping disks 412, limits the spring deflection of the first and second spring beams 420, 422 to an amount below the elastic limit of stress. Otherwise, if the first and second spring beams 420, 422 were allowed to deflect beyond this limit, permanent deformation or "set" may result.

The top surface of the stationary guide mount 401 acts as a reference surface for tape 108. In other words, the tape path is designed such that the bottom edge of the tape 108 travels along the top surface of the stationary guide mount 401. The stationary guide mount has a chamfer to ensure that tape 108 smoothly enters the stationary guide 400.

A pair of damping disks 412 are arranged on the top surface of the spring arrangement 408 to provide a damping mechanism for the pad fingers 410 and the spring arrangement 408. This prevents high excursions of motion at a resonance frequency.

Figure 7:
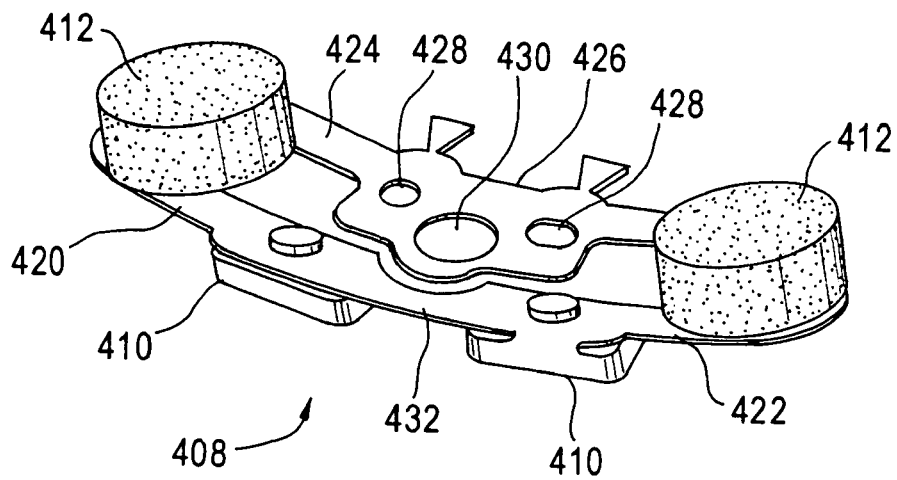
FIG. 7 shows a perspective view of a spring arrangement employed in the fixed guide of FIG. 6, constructed in accordance with an embodiment of the present invention.
Figure 8:
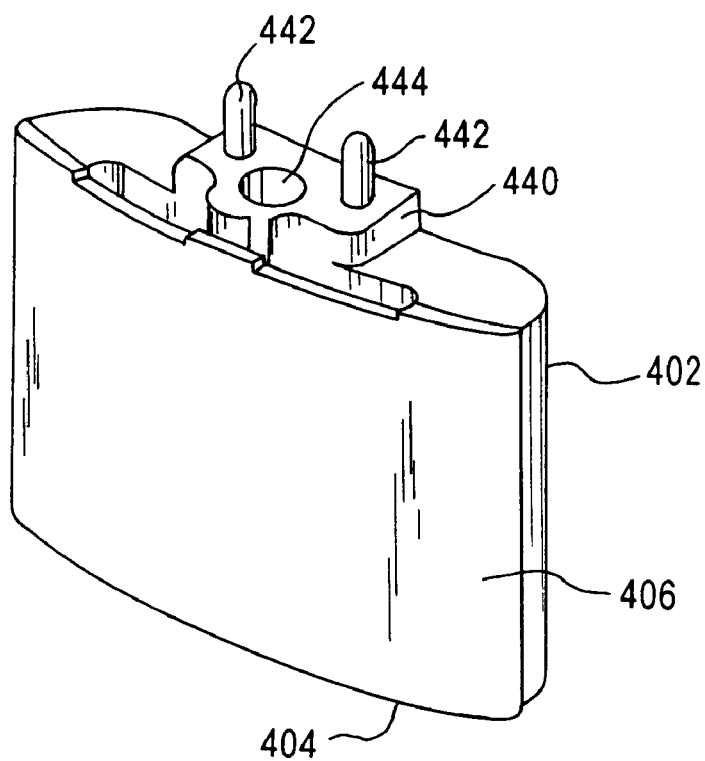
FIG. 8 is a perspective view of the mounting portion and the guide surface portion in an assembled position, in accordance with embodiments of the present invention.

Referring now to the more detailed views of the spring arrangement 408 in FIG. 7 and the body portion of the stationary guide 400 in FIG. 8, a more detailed description of certain features is provided. The spring arrangement 408 includes a first spring beam 420 and a second spring beam 422, as well as a third beam 424. The first and second spring beams 420, 422 are connected together by a notch 432. Each of the first and second spring beams 420, 422 carries a separate pad finger 410 on its undersurface. The pad fingers 410 may be fitted into notches into the first and second spring beams 422 or otherwise attached, by adhesive, etc.

The connection of the first and second spring beams, 420, 422 by the notch 432 allows for a synchronous mode of the spring beams, 420, 422. This permits simultaneous biasing of the tape by the pad fingers 410. For example, if a section of the tape 108 that is too high enters the stationary guide 400, the first pad finger 410 would respond by biasing the tape 108 downwardly. In prior arrangements, the second pad finger 410 would not be aware of the response by the first pad finger 410, and therefore, would have to respond independently. With the present invention, the connection of the first and second spring beams 422 allows the second pad finger 410 to be aware of the biasing of the tape 108 by the first pad finger 410 and respond accordingly by synchronously biasing the tape 108. Hence, the synchronous mode of the first and second spring beams 422 provides advantageous synchronous mode operation during tape guidance.

One of the advantages of the present invention is the relatively longer beam length of the first and second spring beams 420, 422. This allows for a lower spring rate for the stationary guide 400 in comparison to prior stationary guides. The reduced spring rate minimizes tolerance problems by providing a much higher deflection of the pad fingers 410 for an equal load. In exemplary embodiments of the invention, the spring rate achieved is between 25 to 100 g/in. Prior arrangements have spring rates of 200 g/in and 300 g/in.

The pad fingers 410 act on the top edge of the tape 108 with a certain pre-load (a range of 1.2 to 7.0 grams with the preferable pre-load of 3.2 grams). As a result, the pad fingers 410 serve to bias the tape 108 against the top surface of the stationary guide mount 401.

The spring arrangement 408 has a plate 426 forming part of the third beam 422. The plate 426 includes apertures 428 and a central hole 430. The clamping screw 416 (not seen in FIG. 7) passes through the central hole 430 in attaching the cover 414 to the mounting portion 402. The apertures 428 serve as mounting elements to mate with posts 442 molded onto the mounting portion 402.

Referring now specifically to FIG. 8, the posts 442 extend from an inclined seat 440 of the plastic mounting portion 402. A central bore 444 is also located in this seat 440. In certain embodiments of the invention, the seat 440 is inclined, for example by approximately 5 degrees. This inclination of the seat 440 provides pre-loading a larger deflection of the first and second spring beams 420, 422 for a given load. In addition to other features mentioned earlier, this feature also increases the tolerance design for providing a biasing force on the tape 108.

The molded formation of the seat 440, the posts 442 and the central bore 444 provides for a fast and accurate mounting of the spring arrangement 408 to the mounting portion 402. This is achieved without the need of additional spacers, inserts and fasteners employed in prior arrangements. There is therefore a reduction in the costs, increased reliability, and ease of manufacture provided by this arrangement.

In certain embodiments of the invention, the first and second spring beams 420, 422 and the third beam 424 are made of beryllium copper, for example. Other spring materials may be employed without departing from the scope of the present invention, however. The material for the damping disks 412 may be a suitable elastomer, such as neoprene or other rubber-like material.

Figure 9:
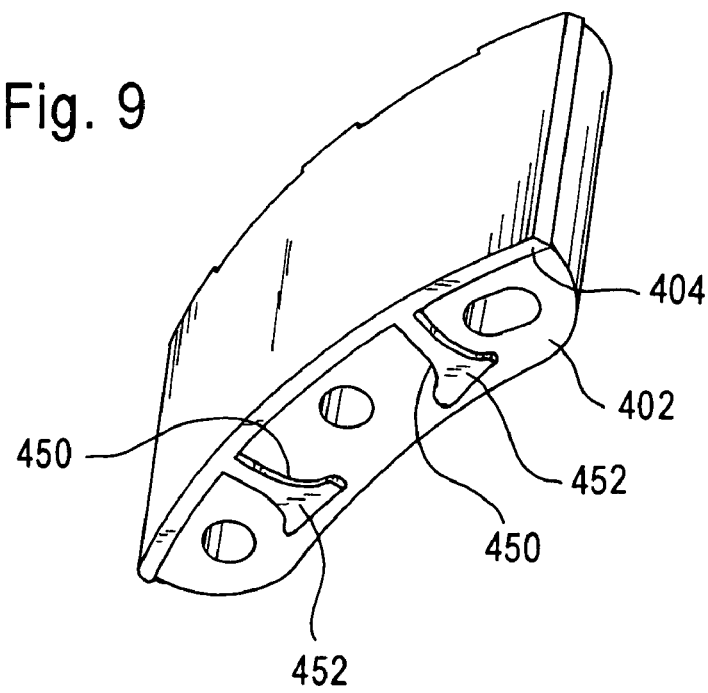
FIG. 9 depicts the structure of FIG. 8 in a perspective bottom view, in accordance with embodiments of the present invention.

FIG. 9 depicts the body portion of the stationary guide 400 to better illustrate the mounting arrangement of the mounting portion 402 and the guide surface portion 404. The guide surface portion 404 has precision formed mating elements 452 that mate with guide surface portion mounting elements 450 formed in the mounting portion 402. For assembly, the mating elements 452 are aligned with the guide surface portion mounting elements 450, and the mounting portion 402 and the guide surface portion 404 are slid relative to each other until complete insertion is achieved. Once the body portion is assembled, the spring arrangement 408 may be mounted, followed by the cover 414 and assembly onto the stationary guide mount 401.

The rear stationary guide 500 may be the same in construction as the front stationary guide 400 in preferred embodiments and is thus not depicted in more detail.

Figure 5A:
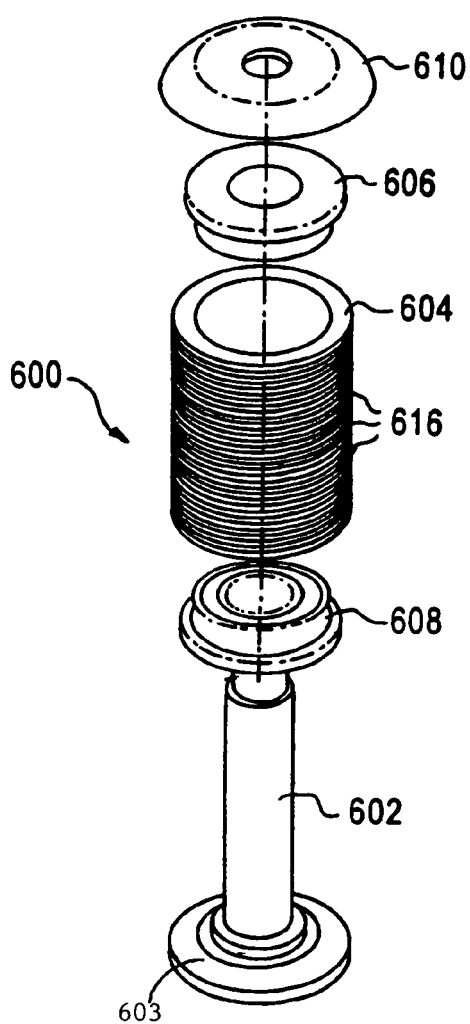
FIGS. 5A–5C are several views of the rearward guide roller assembly of FIG. 1.
Figure 5B:
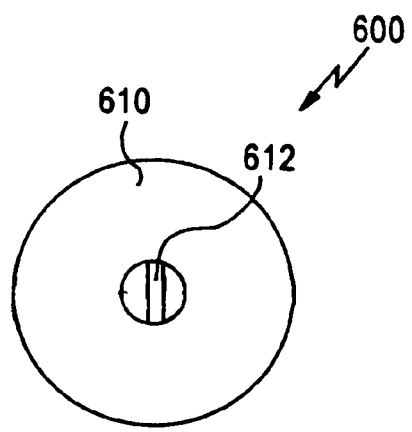
Figure 5C:
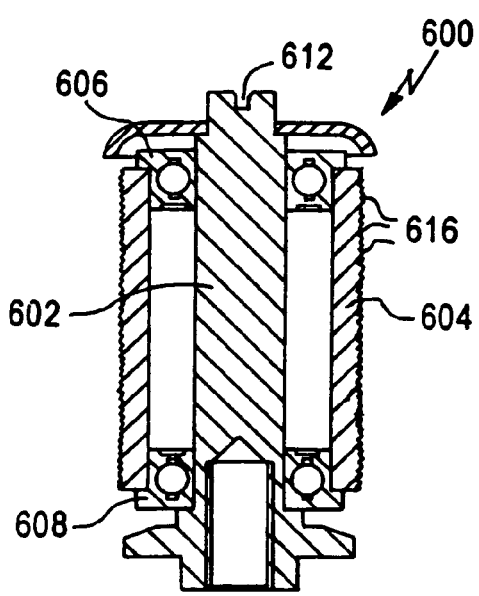

The rearward guide roller 600, which is shown in FIGS. 5A–5C and located near take-up reel 200, is substantially similar to the forward guide roller 300. As such, the rearward guide roller 600 includes a shaft 602, which has an underside that acts as a mounting surface 603 for the rearward guide roller 600. The shaft 602 is attached to the main base plate 102 of the tape drive 100 via a screw (not shown).

Disposed about the shaft 602 is a rotor or sleeve 604 having a plurality of ridges 616. The rotor 604 is supported by ball bearings 606, 608, which are located at either end of the shaft 602. A cover 610 is placed over the a distal end of the shaft 602 to prevent contaminants from falling into the interior of the rotor 604 and the ball bearings 606, 608.

The distal end of the shaft 602 is also equipped with a slot 612 (or anti-rotation mechanism) that is used to prevent the shaft 602 from rotating during installation of the first guide roller onto the main base plate 102 of the tape drive 100. For example, the head of a flat-head screw driver can be inserted into the slot 612 to prevent the shaft 602 from rotating while the screw (not shown) is inserted into the proximal end of the shaft 602 through the main base plate 102.

When the tape is travelling at a rate greater than 1 m/sec, an air bearing is formed between the tape 108 and a conventional rotor 604. The normal operational velocity for the tape drive 100 is about 4 m/sec. At this speed, a conventional guide roller will have little effect on tape guiding when the tape drive 100 is operated. As a result, the tape 108 flys, resulting in negligible friction loss and negligible resistance to control by the reel hub 202.

After the tape 108 passes the rearward guide roller 600 it is wound on the take-up reel 200. The quality of the winding of the tape 108 on the take-up reel 200 is maintained due to the alignment of the take up reel 200 and the design and separation of the reel flanges.

In the reverse read/write mode, 108 flies over the rearward guide roller assembly 600. The pads 510 and 512 act to reduce vertical motion of tape 108 as the tape drive 100 starts and stops or switches from the reverse read/write mode to the forward read/write mode or vice versa. This ensures that the tape path will be the same at the head locations in the forward and reverse read/write mode and that tape edge buckling will not occur.

In the tape drive according to the invention, the tension in the tape is controlled by the reel that is supplying the tape, that is, the reel that is pulling the tape. If the tape drive is operating in the forward read/write mode, then the supply reel (i.e., the cartridge reel) controls the tension, but if the tape drive is operating in the reverse read/write mode, then tension is controlled by the take-up reel. To ensure proper operation of the tape drive and optimal read/write performance, a certain tension (a range of 0.7 Newtons to 1.3 Newtons, with a preferable tension of 1 Newton) must be present at the read/write head. The drops in tension at the fixed guides and the guide rollers are minimal and predictable. Thus, the tension at the read/write head is very controllable with the tape path according to the invention.

Although the present invention has been described and illustrated in detail, this to be clearly understood that the same is by way of illustration and example only and is not to be taken by way of limitation, the scope of the present invention being limited only by the terms of the appended claims.

What is claimed is:

1. A magnetic recording tape drive comprising:
   a read/write head; and
   means for guiding tape past the read/write head having at least one dampening disk.

2. A magnetic recording tape drive comprising:
   a magnetic read/write head; and
   a stationary guide for guiding tape past the magnetic read/write head, the stationary guide having:
   a mounting portion and a separate guide surface portion mounted on the mounting portion;
   a spring arrangement mounted directly on the mounting portion to apply pressure to a top edge of the tape during guiding of the tape, the spring arrangement having at least two spring beams; and
   a dampening disk on each of the at least two spring beams.

3. The drive of claim 2, wherein the guide surface portion is composed of a wear-resistant material.

4. The drive of claim 3, wherein the wear-resistant material is a ceramic.

5. The drive of claim 4, wherein the mounting portion comprises a molded plastic.

6. The drive of claim 5, wherein the mounting portion has molded spring mounting elements, the spring arrangement having mating spring seating elements that mate with the spring mounting elements to mount to the spring arrangement on the mounting portion.

7. The drive of claim 6, wherein the mounting portion has guide surface portion mounting elements, the guide surface portion having mating elements that mate with the guide surface portion mounting elements to mount the guide surface portion to the mounting portion.

8. The drive of claim 7, wherein each spring beam supports a pad finger configured to bear against the top of the tape during guiding of the tape.

9. The drive of claim 8 wherein the spring arrangement further includes a connecting notch between the two spring beams that connects the spring beams.

10. The drive of claim 9, wherein the mounting portion has an inclined seat configured to receive and seat the spring arrangement to incline the spring arrangement at a non-perpendicular angle with respect to the tape during guiding of the tape.

* * * * *